United States Patent [19]

Nakano

[11] Patent Number: 5,230,258
[45] Date of Patent: Jul. 27, 1993

[54] GEAR HOUSING FOR ACCOMMODATING GEAR TRAIN OF TOROIDAL CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 577,370

[22] Filed: Sep. 5, 1990

[30] Foreign Application Priority Data

Sep. 6, 1989 [JP] Japan .................................. 1-230724

[51] Int. Cl.$^5$ ...................... F16H 15/08; F16H 57/02
[52] U.S. Cl. ...................................... 74/606 R; 476/42
[58] Field of Search ................... 74/200, 600 R, 680, 74/691, 199

[56] References Cited

U.S. PATENT DOCUMENTS

| | | | |
|---|---|---|---|
| 3,371,546 | 3/1968 | Spangler et al. | 74/200 |
| 3,430,504 | 3/1969 | Dickenbrock | 74/200 |
| 4,122,730 | 10/1978 | Welland . | |
| 4,893,517 | 1/1990 | Nakano | 74/200 |
| 4,928,542 | 5/1990 | Nakano | 74/200 |
| 4,934,206 | 6/1990 | Nakano | 74/200 |
| 4,968,289 | 11/1990 | Nakano | 74/200 |
| 5,033,322 | 7/1991 | Nakano | 74/200 |
| 5,067,360 | 11/1991 | Nakano | 74/200 |

FOREIGN PATENT DOCUMENTS 784296 10/1957 United Kingdom ................. 74/200

OTHER PUBLICATIONS

SAE (Society Of Automotive Engineers Inc.) Paper 751180, A Continuously Variable Transmission For Automotive Fuel Economy.
Patent Abstracts of Japan, vol.13, No. 489, (M-888)(3837) Nov. 7, 1989.

Primary Examiner—Vinh T. Luong
Attorney, Agent, or Firm—Foley & Lardner

[57] ABSTRACT

A gear noise free toroidal continuously variable transmission is disclosed wherein in order to suppress occurrence of gear noise, a gear train is accommodated in a gear housing which includes a first housing part fixedly secured to a transmission casing and a second housing part fixedly secured to the first housing part to form a dual-walled structure.

5 Claims, 2 Drawing Sheets

GEAR HOUSING FOR ACCOMMODATING GEAR TRAIN OF TOROIDAL CONTINUOUSLY VARIABLE TRANSMISSION

BACKGROUND OF THE INVENTION

The present invention relates to a toroidal continuously variable transmission, and more particularly to a gear housing for accommodating a gear train of the toroidal continuously variable transmission.

A so-called double cavity toroidal continuously variable transmission is known according to a publication "A Continuously Variable Transmission for Automotive Fuel Economy" SAE (Society of Automotive Engineers Inc.) Paper 751180, see FIG. 7 thereof.

U.S. Pat. No. 4,928,542 issued to Nakano on May 29, 1990 shows a double cavity toroidal continuously variable transmission. This transmission includes a gear train for transmitting a rotary motion of two output discs to an intermediate shaft. The gear train includes an output gear splined to both of the output discs, and a drive gear splined to the intermediate shaft. The output gear meshes the drive gear. The gear train is disposed between the output discs and supported by a gear housing which is also disposed between the output discs. The gear housing includes a first housing part fixedly secured to a transmission casing and a second housing part fixedly secured to the first housing part. The first and second housing parts extend to cover the opposite axial end faces of the output gear and are formed with bearing supports for the output gear. The first housing part extends further to cover one axial end face of the drive gear and is formed with a bearing support for the drive gear, but the second housing part does not further extend to cover the opposite axial end face of the drive gear. This structure of the gear housing is found to be not satisfactory in that it is difficult to sustain torque stress imparted to the drive gear, causing occurrence of gear noise between the output and drive gears.

An object of the present invention is to improve a toroidal continuously variable transmission such that occurrence of gear noise derived from a gear train is suppressed.

SUMMARY OF THE INVENTION

According to the present invention, a toroidal continuously variable transmission comprises a gear housing, and a gear train within the gear. The gear housing includes a first housing part and a second housing part fixedly secured to the first housing part forming a dual-walled structure.

According to the present invention, there is provided a toroidal continuously variable transmission comprising:
 a transmission casing;
 coaxial input and output discs having facing toric surfaces;
 a gear housing disposed within and fixedly secured to said transmission casing; and
 a gear train within said gear housing and including an output gear in driving connection with said output discs,
 said gear housing including a first housing part and a second housing part fixedly secured to said first housing part to form a dual-walled structure which is so constructed and arranged as to enclose said gear train.

DETAILED DESCRIPTION OF THE INVENTION

Figure 1:
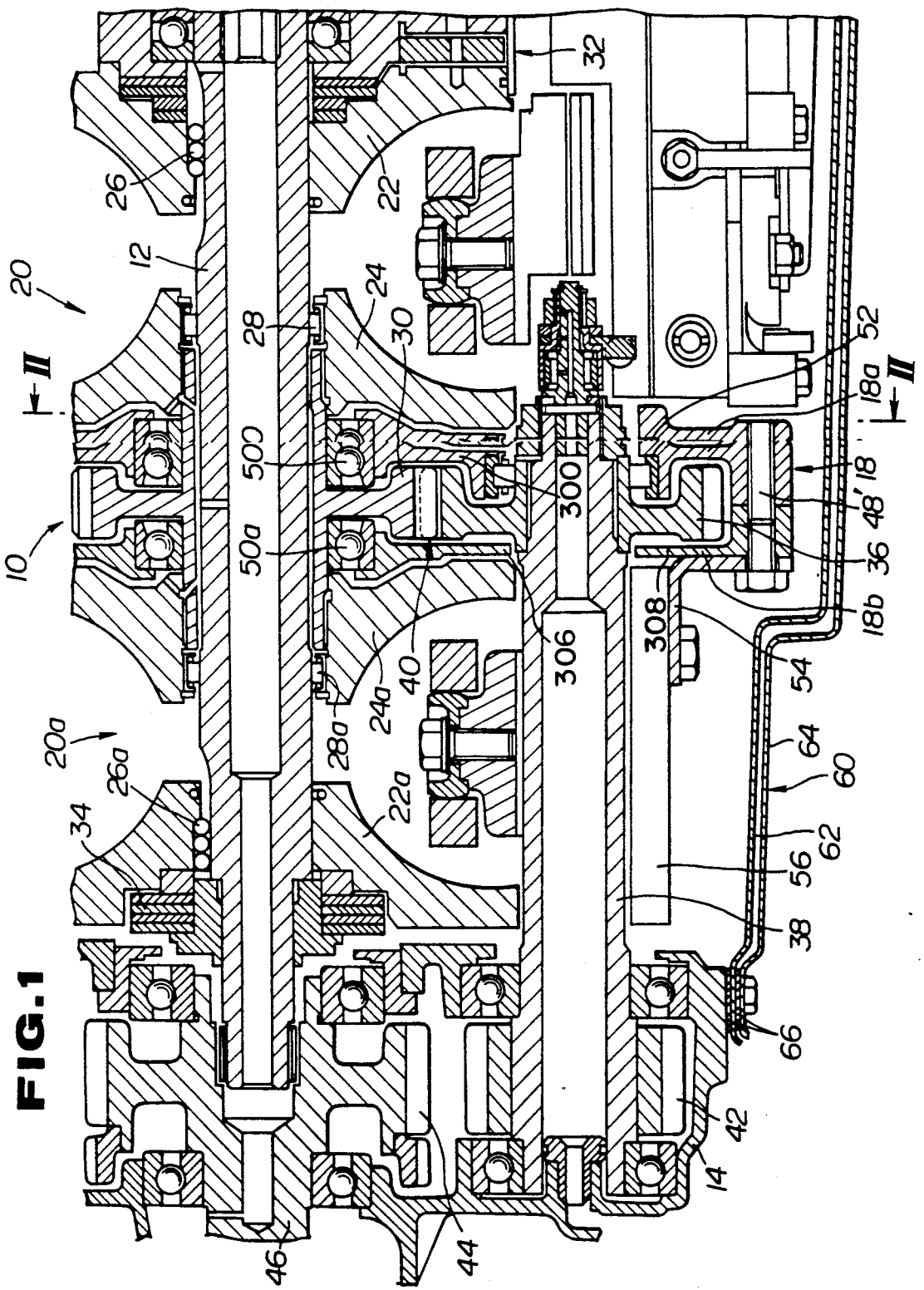
FIG. 1 is a fragmentary diagrammatic section of a toroidal continuously variable transmission.

Referring to the accompanying drawings, and particularly to FIG. 1, a toroidal continuously variable transmission is generally designated by the reference numeral 10 and comprises an input shaft 12 rotatably supported by a transmission casing 14. The toroidal continuously variable transmission 10 includes a first toroidal change-speed mechanism 20 and a second toroidal change-speed mechanism 20a. The first toroidal change-speed mechanism 20 has a first set of coaxial input and output discs 22 and 24 having facing toric surfaces and a plurality of friction rollers, not shown, disposed between and in driving contact with the toric surfaces for transmitting torque between the input and output discs 22 and 24. Similarly, the second toroidal change-speed mechanism 20a has a second set of coaxial input and output discs 22a and 24a having facing toric surfaces and a plurality of friction rollers, not shown, disposed between and in driving contact with the toric surfaces for transmitting torque between the input and output discs 22a and 24a.

As shown in FIG. 1, with the output discs 24 and 24a adjacent to each other, the two sets of coaxial input and output discs 22 and 24, and 22a and 24a are mounted on the input shaft 12. The input discs 22 and 22a are mounted on the input shaft 12 by ball splines 26 and 26a, respectively, for rotation and limited axial movement relative to the input shaft 12. The output discs 24 and 24a are rotatably supported on the input shaft 12 by needle bearings 28 and 28a, respectively.

Between the output discs 24 and 24a is disposed an output gear 30 rotatable about the input shaft 12 and in driving connection with both of the output discs 24 and 24a by spline connections, not shown.

For transmitting a rotary motion from the input shaft 12 to the input discs 22 and 22a, a loading cam 32 is operatively disposed between the input shaft 12 and the input disc 22, and a bellevile spring 34 between the input disc 22a and the input shaft 12.

For transmitting a rotary motion of the output discs 24 and 24a to an intermediate shaft 38, the output gear 30 meshes a drive gear 36 splined to the intermediate shaft 38. The output gear 30 and drive gear 36 cooperate with each other to form a gear train 40.

The rotary motion of the intermediate shaft 38 is transmitted to an output shaft 46 via a counter gear 42 splined to the intermediate shaft 38, an idler gear, not shown, and a main gear 44 of the output shaft 46.

The bottom of the transmission casing 14 is closed by an oil pan 60. The oil pan 60 is of a dual-walled structure including an inner pan 62 and an outer pan 64. Between the inner and outer oil pans 62 and 64 is defined a passage through which a cooling water for cooling lubricant oil flows. The inner pan 62 is made of an aluminium which exibits a good thermal conductivity and which is less susceptible to oxidation owing to contact with a traction oil used as the lubricant oil, while the outer pan 64 is made of a steel plate with a high rigidity. Disposed between the outermost portion of the inner oil pan 62 and the adjacent portion of the transmission casing 14 and between the outermost portion of the inner oil pan 62 and the adjacent outermost portion of the outer oil pan 64 are gaskets 66 for filling small gaps created owing to a difference in heat expansion between the materials which the inner and outer pans 62 and 64 are made of. Although not shown, a cooling water admission port is disposed near an oil inlet port of an oil suction pipe, and a cooling water discharge port is arranged remote from the oil inlet port.

Figure 2:
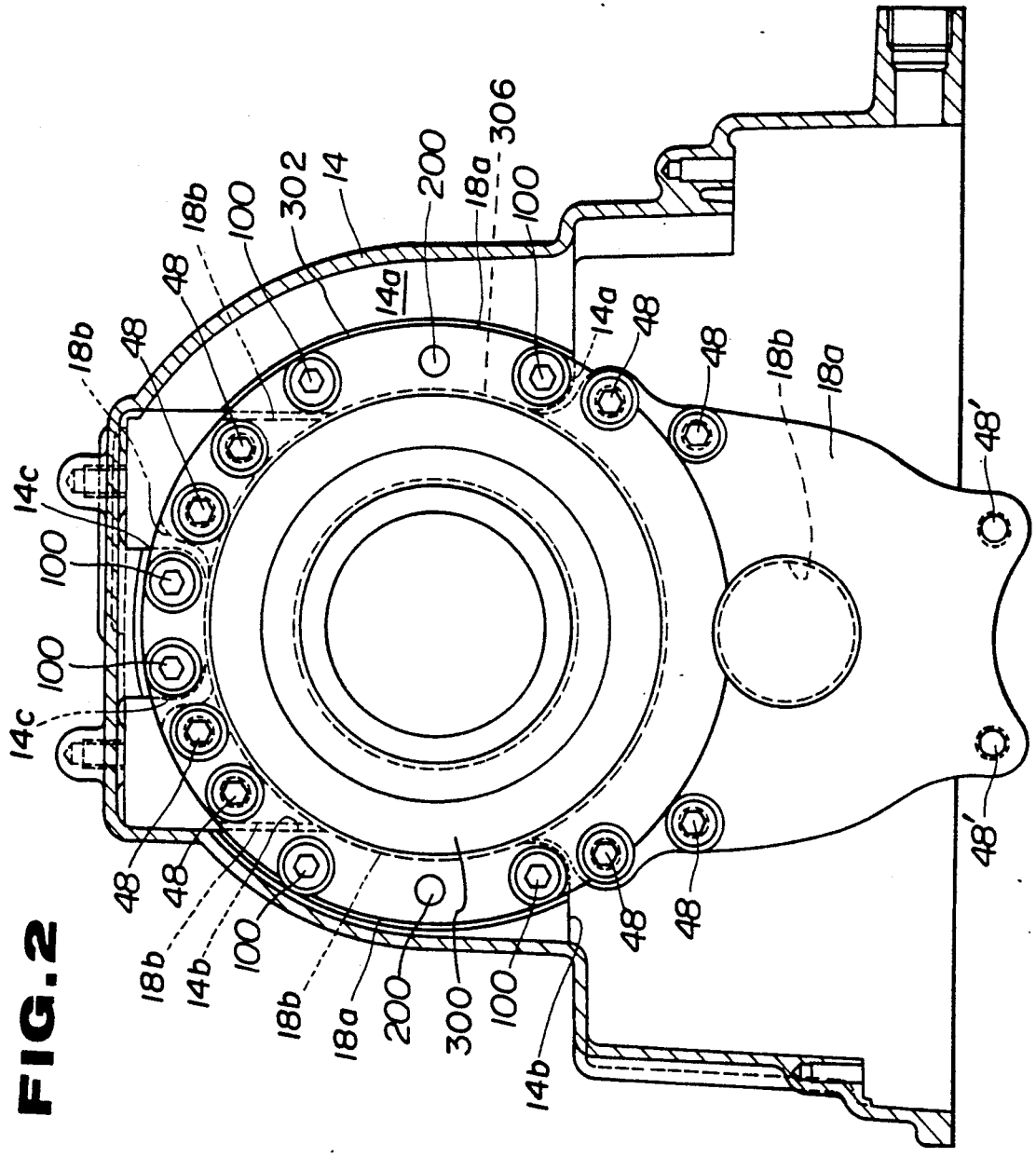
FIG. 2 is a cross section taken through the line II—II in FIG. 1 illustrating an end elevation of a gear housing with unnecessary parts removed.

Referring to FIG. 1, the gear train 40 is accommodated in and covered by a dual-walled gear housing 18 which is disposed between the output discs 24 and 24a. As best seen in FIG. 2, the transmission casing 14 has inwardly projecting lateral extensions 14a and 14b, and an inwardly projecting top extension 14c. The gear housing 18 includes a first or main housing part 18a, and a second or cover housing part 18b. As shown in FIG. 2, the first housing part 18a includes a generally circular portion 300 having an annular attachment area 302 fixedly secured to the inwardly projecting lateral extensions 14a and 14b of the transmission housing 14 and to the inwardly projecting top extension 14c thereof by six bolts 100. The first housing part 18a also includes a skirt portion 304 downwardly extending from the circular portion thereof. The second housing part 18b has substantially the same configuration as the first housing part 18a as viewed in FIG. 2. Thus, as shown in FIG. 1 the second housing part 18b includes a generally circular portion 306 and a skirt portion 308 downwardly extending from the circular portion 306 thereof. However, the circular portion 306 of the second housing part 18b is different from that of the first housing part 18a in that an attachment area is not continuous and formed with cutouts to allow extension of the inwardly projecting lateral and top extensions 14a, 14b, and 14c of the transmission casing 14, leaving circumferentially-spaced attachment area zones. The second housing part 18b is fixedly secured to the first housing part 18a by eight bolts 48. All of these bolts 48 are screwed into the corresponding bolt holes from the first housing part 18a. However, the bottom two bolts 48' are screwed into the corresponding bolt holes from the second housing part 18b (see FIG. 1 also). In order to facilitate adjusting of the bolts 100, 48, and 48' with the corresponding bolt holes, the first housing part 18a is formed with two pin holes for receiving two locate pins 200, respectively.

As shown in FIG. 1, the first and second housing parts 18a and 18b are formed with bearing supports for ball bearings 50 and 50a, respectively, by which the output gear 30 is rotatably supported on the gear housing 18. The first housing part 18a is formed also with a bearings support for roller bearing 52 by which the drive gear 36 is rotatably supported on the gear housing 18.

In order to strengthen the bottom of the skirt portions of the first and second housing parts 18a and 18b, a gusset or bracket 54 is fixedly secured to the second housing part 18b at the bottom of the skirt portion by the two bolts 48' and also secured to a rigid member fixedly secured to the transmission casing. In this embodiment the rigid member is a control valve assembly 56.

From the previous description of the embodiment according to the present invention, it will now be appreciated that the gear housing 18 is of the dual-walled structure and thus provides increased rigid bearing supports for the gear train 40, thus effectively suppressing occurrence of noise derived from between the output and drive gears 30 and 36.

Owing to the gusset 54, the rigidity of the bottom portion of the gear housing is remarkably increased.

Owing to the structure of the gear housing 18 described above, the wall portions of the housing parts 18a and 18b may be reduced in thickness. Thus, occurrence of gear noise is suppressed without any substantial increase in weight.

Lastly, the gear housing 18 encloses the gear train 40 to confine noise derived from the gear train 40 therein, thus preventing transmission of gear noise outwardly.

What is claimed is:

1. A toroidal continuously variable transmission comprising:

a transmission casing;

coaxial input and output discs having facing toric surfaces;

a gear housing disposed within and fixedly secured to said transmission casing; and a gear train within said gear housing and including an output gear in driving connection with said output discs, said gear housing including a first housing part and a second housing part fixedly secured to said first housing part to form a dual-walled structure which is so constructed and arranged as to enclose said gear train to confine noise derived from said gear train therein.

2. A toroidal continuously variable transmission comprising:

a transmission casing;

coaxial input and output discs having facing toric surfaces;

a gear housing disposed within and fixedly secured to said transmission casing; and a gear train within said gear housing and including an output gear in driving connection with said output discs, said gear housing including a first housing part and a second housing part fixedly secured to said first housing part to form a dual-walled structure which is so constructed and arranged as to enclose said gear train to confine noise derived from said gear train therein, wherein said first housing part includes a generally circular first portion fixedly secured to said transmission casing and a first skirt portion extending from said first portion, and said second housing part includes a generally circular second portion fixedly secured to said generally circular first portion of said first housing part and a second skirt portion extending from said generally circular second portion.

3. A toroidal continuously variable transmission as claimed in claim 2, including a rigid member fixedly secured to said transmission casing, and a gusset fixedly secured to said rigid member and also to said first and second skirt portions at bottom portions thereof for strengthening the structural rigidity of said gear housing.

4. A toroidal continuously variable transmission as claimed in claim 2, wherein said gear train includes a drive gear in mesh with said output gear, and said first and second housing parts are formed with first bearing supports, respectively, for said output gear, and said second housing part is formed with a second bearing support for said drive gear.

5. A toroidal continuously variable transmission comprising:

a transmission casing;

a first set of coaxial input and output discs having facing toric surfaces;

a second set of coaxial input and output discs having facing toric surfaces;

said output discs of said first and second sets being disposed adjacent to each other;

a gear housing disposed between said output discs and fixedly secured to said transmission casing; and a gear train within said gear housing and including an output gear in driving connection with said output discs;

said gear housing including a first housing part and a second housing part fixedly secured to said first housing part to form a dual-walled structure which is so constructed and arranged as to enclose said gear train to confine noise derived from said gear train therein.

* * * * *